Jan. 15, 1952 R. M. GREENLEAF 2,582,427
DEVICE FOR CHECKING ALIGNMENT OF VEHICLE WHEELS
Filed Feb. 28, 1948 2 SHEETS—SHEET 2

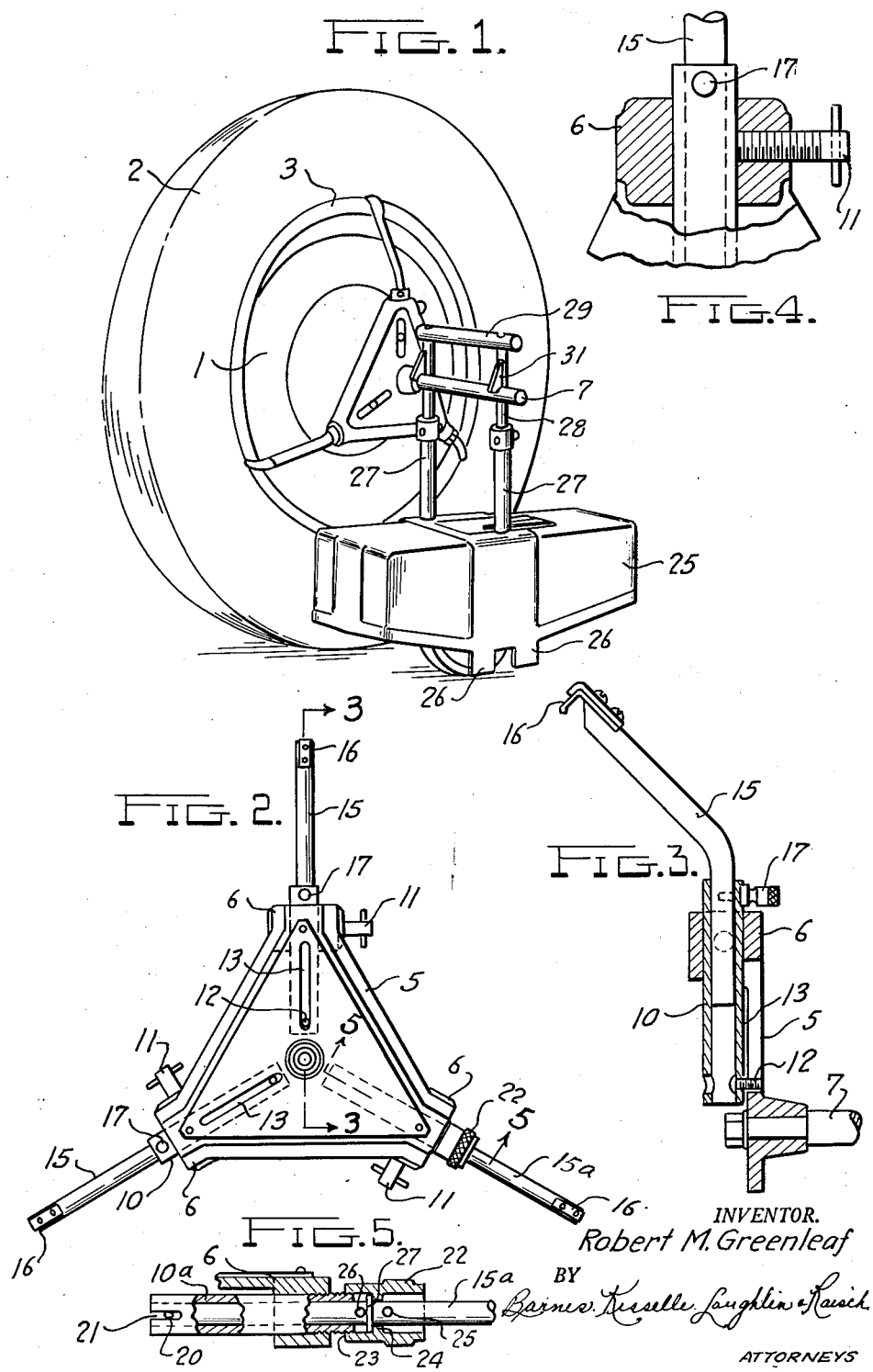

INVENTOR.
Robert M. Greenleaf
BY
*Barnes, Kisselle, Laughlin & Raisch*
ATTORNEYS Patented Jan. 15, 1952

2,582,427

UNITED STATES PATENT OFFICE 2,582,427

DEVICE FOR CHECKING ALIGNMENT OF VEHICLE WHEELS

Robert M. Greenleaf, Grosse Pointe, Mich., assignor to M. L. Trust, F. R. Pendleton, Everett, Wash., as trustee Application February 28, 1948, Serial No. 11,983

3 Claims. (Cl. 33—203.15)

This invention relates to a device for checking the alignment of wheels of automotive vehicles.

The most important factor in the proper operation and function of the wheels of an automotive vehicle is that of alignment. A proper alignment results in a true rolling action without side slip of the wheel on the pavement or other roadway. Numerous things may occur to cause misalignment resulting in side slip of a wheel thereby causing undue wear of the tire as well as an improper action in the steering and operation of the vehicle. The intricate mounting of the dirigible front wheels is quite subject to getting out of adjustment resulting in side slip and faulty steering. The front wheels are usually mounted so that they have what is known as a toe-in and camber, and the king pins upon which the front wheels turn in the steering of the vehicle are usually mounted in an inclined manner lengthwise of the vehicle so that the wheel has what is termed caster, and the king pins usually incline transversely of the vehicle, commonly termed king pin inclination. Unless all these factors are properly adjusted, the wheel or wheels in all likelihood are out of alignment. Different manufacturers have varying specifications for camber, caster, toe-in and king pin inclination, but each vehicle should be in proper adjustment in accordance with the specifications of the manufacturer. On the other hand, the rear wheels may be out of alignment because of a bent rear axle housing or misalignment of the housing, broken or worn spring shackles, or center bolts, mismated springs, or a bent frame, as well as other factors.

The present invention aims to provide an improved wheel alignment gauge of the trailing wheel type which is applicable to a wheel while the wheel is supporting the normal weight of the vehicle and which functions to indicate the alignment or misaligment condition of the wheel as the vehicle is rolled along a supporting surface. Among the objects are the provision of a device of rugged compact construction capable of being easily handled and quickly attached to a wheel so that all the wheels of the vehicle may be quickly and easily checked in the matter of a few minutes. The device shows accurately how each wheel is moving when the car is in motion on the road. The device is of such a simple nature that the ordinary mechanic may very easily learn how to accurately use the device.

A device constructed in accordance with the invention is shown in the accompanying drawings:

Fig. 1 is a perspective view of the device applied to a vehicle wheel.

Fig. 2 is an elevational view of the wheel attachment.

Fig. 3 is a sectional view slightly enlarged and taken substantially on line 3—3 of Fig. 2.

Fig. 4 is a view partly in section showing some of the structure of the wheel attachment.

Fig. 5 is a detailed view in section slightly enlarged and taken substantially on line 5—5 of Fig. 2.

Figures 6, 8, 9:
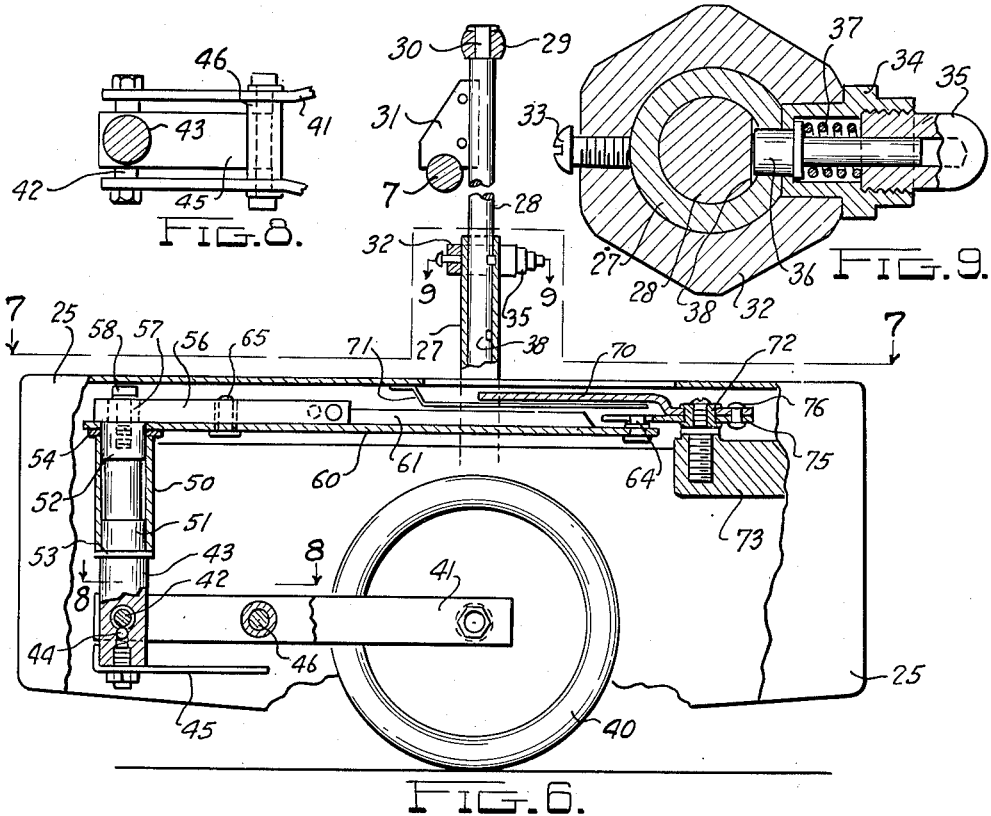
Fig. 6 is a view with some parts in section and some parts cut away illustrating the structure of the gauge.
Fig. 8 is a detail view showing the mounting for the trailing wheel and taken substantially on line 8—8 of Fig. 6.
Fig. 9 is an enlarged sectional view taken on line 9—9 of Fig. 6 showing a mounting for a supporting rod.

The vehicle wheel, as shown in Fig. 1, has a wheel portion 1 upon which is mounted a pneumatic tire 2 and the wheel portion has a rim 3. The attachment is arranged to engage the rim. This attachment, as shown in Figs. 2 and 3, has a center body portion 5 arranged to support three arms to which end the body portion is of triangular shape with enlarged sleeve elements 6. The center of the body is provided with a projecting spindle 7.

Two of the three arms each include a tube 10 arranged to be adjustably clamped in position by a screw 11 and each arm carries a stud or key which may be a screw 12 which operates in an elongated slot 13 thereby lending stability to the tube mounting. Each of these two tubes carries a bent rod or arm 15, each provided with a hook portion 16 arranged to engage over the rim 3 of the wheel. Each arm 15 is secured to its tubular element by a thumb screw 17.

The third arm embodies a tube section 10a also arranged to be clamped by its screw 11. The rod 15a which is provided with the hook 16 extends substantially through the tube 10a and is non-rotatably and slidably keyed to the tube 10a as at 20, a pin in the rod 15a operating in an elongated slot 21 in the tube 10a. A nut 22, through which the rod 15a extends is screw threaded to the tube 10a as at 23, and this nut, while rotatable with respect to the rod 15a is fixed axially with respect thereto. To this end, the nut has an internal flange 24 while the rod has a pin 25 on one side of the flange and a pin 26 on the opposite side of the flange, there being a washer 27 between the pin 26 and the flange.

With this construction, it will be seen that each of the arms has a major adjustment for different sizes of wheels which can be made by loosening the screws 11 and shifting the tubular elements as desired. With the major adjustments made for a wheel of known size, the nut 22 may be manipulated to extend the arm 15a and then the several hooks 16 applied to the rim whereupon the nut 22 may be turned to pull the rod 15a inwardly and thereby tighten the attachment assembly to the wheel. With this done the spindle 7 projects axially substantially from the center of the wheel and it is upon this projection that the gauge is mounted. The fact that the spindle may not be precisely on the center line of the axis of the wheel does not disturb the reading of the gauge.

The gauge has a protective housing generally indicated at 25 with side walls, end walls, and a top wall as indicated, but which is open at the bottom. The opposite side walls have projecting foot portions 26 for supporting the gauge when it is placed upon a floor or other surface.

Mounted on the housing and projecting upwardly therefrom are two tubular posts 27, each adjustably carrying a rod 28. The two rods are joined at the top by a handle 29 to which the rods are rotatably mounted as at 30. Each rod carries a suspension hook 31, adapted to engage the spindle 7 as indicated.

The rods 28 telescope into the tubes 27 and are adjustable therein as shown in Fig. 9. Each tube carries an enlargement 32 which may be applied thereto by a set screw 33 and each enlargement has a fitting 34 with a screw threaded cap 35 which cooperate to house a plunger 36 projected by a spring 37. Each rod has a plurality of cut away portions forming flats 38 into which the plunger is projected. By turning a rod 28 in its tube, the flat spot 38 is disaligned from the plunger and the plunger is caused to be shifted back against the action of the spring and then the rod may be shifted axially to locate another notch or flat spot for engagement with the plunger. In this way, the length of the suspension means for the gauging instrument may be varied to thus accommodate wheels of different diameters. In the action of turning a rod in its tube, the rod swivels in the handle 29.

A trailing wheel 40 is journalled in a yoke or fork 41 and the two members of the fork are mounted on a rocker pin 42 which is mounted to rock in a vertical swivel pin 43. As shown in Fig. 6, the rocker pin 42 passes through and is journalled in the swivel pin and the rocker pin is held against axial displacement by means of a spring pressed ball or element 44 which functions in a groove in the rocker pin. The swivel pin carries a projecting bracket 45 which underlies a cross pin 46 of the yoke 41. This limits the downward movement of the wheel 40 when the device is picked up by its handle 39 as the pin 46 engages the bracket 45 and the wheel and its fork are suspended thereby.

Fixedly mounted within the housing is a bearing sleeve 50 and the swivel pin 43 is journalled therein, the pin having bearing portions 51 and 52 and the swivel pin is held against axial displacement by washers 53 and 54.

An arm 56 is mounted on an upper extension 57 of the swivel pin and held in assembly by a cap screw 58. Mounted under the arm so it can swivel with respect to the swivel pin is a second and elongated arm 60. This arm is of sheet metal construction having upturned edges 61 and 62 and at its free end is provided with an upwardly extending pin 64. The arm 56 is non-rotatable with respect to the swivel pin and the arm 56 and the arm 60 are loosely connected as by means of a loose rivet 65. The two arms are adjustable relative to each other for calibrating purposes. This arrangement embodies two calibrating screws 63 threaded into the arm 56 and having heads for engaging the opposite flanges 61 and 62. It will be seen that by loosening one screw and tightening the other, that the relative positions of the two arms may be varied. The heads of the screws have holes 65 therein adapted to receive locking wires 66 which are passed therethrough to prevent rotation of the screws after an adjustment has been made.

Figure 7:
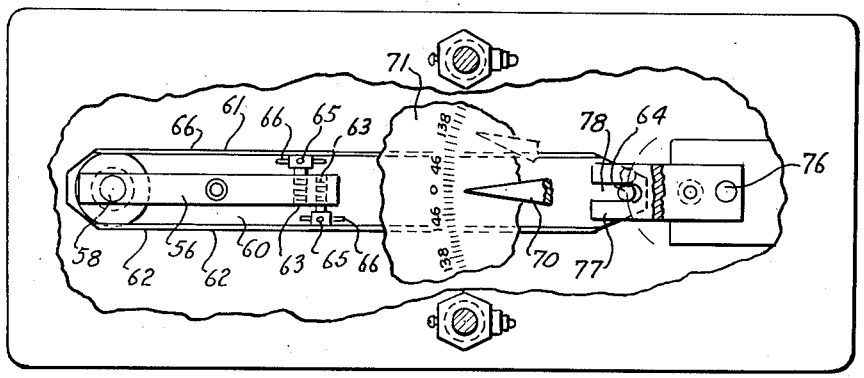
Fig. 7 is a view looking substantially on line 7—7 of Fig. 6 with some parts cut away illustrating the gauge.

There is a pointer 70 arranged to operate over a dial 71. This pointer is swiveled on a post 72 mounted in a bracket 73 in the housing. The pointer has an underlying part 75 connected to the part 70 as by means of a rivet 76. The part 75 has a projecting bifurcated portion 77 which provides a slot 78 in which is disposed the pin 64 (Figs. 6 and 7).

The dial or scale 71 has suitable calibrated indicia thereon which conveniently may indicate the side slip of the wheel. For example, the dial may show the number of feet of side slippage per mile of travel of the vehicle and this is the indication on the dial as shown in Fig. 7.

In use, the device is attached to a wheel as shown in Fig. 1 with the hooks 31 engaging the spindle 7 with the gauge depending therefrom and with the trailing wheel 40 engaging the floor or roadway. In this position, the fork of the trailing wheel is to be free of the bracket 45. As explained above, the rods 28 may be adjusted relative to the tubes 27 to accommodate for wheels of different diameters. It takes but a moment to apply the attachment to the wheel because of the quick adjusting features. The vehicle is now rolled along the floor of the garage or roadway with the trailing wheel 40 functioning on the floor or roadway. Due to the swivel pin mounting 43 the trailing wheel will adjust itself in a true trailing position parallel to the direction of movement. If the wheel is disaligned so that the projecting spindle is not in a true position relative to the direction of movement of the vehicle, the housing and, therefore, the dial carried thereby will take a position determined by the spindle while the trailing wheel, due to its swivel mounting, will take position which is true relative to the direction of movement of the vehicle. In other words, the trailing wheel causes the swivel pin 43 to turn in its mounting relative to the housing and this causes an oscillation of the arm 60. The oscillating movement of the arm 60 through the pin 64 oscillates the pointer 70 to give an indication on the dial as illustrated in Fig. 7. This will indicate the amount of side slip of the wheel on the roadway per mile of travel and it also indicates the direction of the side slip depending upon which side of the zero position the pointer indicates. If the vehicle wheel is in a true position, the indication is zero. Thus, when applied to a front wheel, the gauge indicates an improper mounting of the wheel which may be due to an improper setting of one or more of the factors previously mentioned or to other factors, such as a bent tie rod or frame or the like. If side slip is indicated when the instrument is attached to a rear wheel, such things as a bent axle housing, a bent frame, broken or defective shackles or improperly matched springs may be indicated.

The housing protects the mechanism and makes for a rugged structure for long life and when the instrument is picked up and carried to and from the point of use, the trailing wheel drops until it rests upon the bracket 45.

I claim:

1. A gauge for vehicle wheels comprising, a housing open at the bottom, means for suspending the housing from a spindle projecting substantially from the axis of the vehicle wheel to be gauged, a trailing wheel in the housing adapted to partially project therebelow to engage and operate upon the floor or roadway as the vehicle is moved along the floor or roadway, an arm for supporting the trailing wheel, a substantially vertically disposed swivel pin in the housing, means pivotally mounting the arm to the swivel pin on a substantially horizontal axis, a dial and a pointer, one fixedly carried by the housing and the other articulated to the swivel pin for relative actuation thereof as the trailing wheel oscillates the swivel pin to indicate misalignment of the vehicle wheel, said housing having supporting portions extending downwardly from its open bottom for resting upon a floor or other support with the trailing wheel confined within the housing.

2. In a gauge for vehicle wheels, a supporting structure adapted to be suspended from a spindle projecting substantially from the axis of the vehicle wheel being gauged, a trailing wheel having its axis substantially in vertical alignment with the spindle, a substantially vertical swivel pin, an arm mounted on the swivel pin on a substantially horizontal axis, said arm being connected to the trailing wheel and the swivel pin being located in a position which is laterally removed from and forwardly of the trailing wheel in the direction of movement of the vehicle during the gauging operation, a dial, a pivotally mounted pointer for operation over the dial, said pointer being mounted on the side of the axis of the trailing wheel opposite the swivel pin, a second arm carried by the swivel pin, the pointer having a projecting element, said second arm and element having a pin and slot connection removed from the pivotal mounting of the pointer whereby oscillation of the swivel pin oscillates the pointer.

3. In a gauge for vehicle wheels, a supporting structure adapted to be suspended from a spindle projecting substantially from the axis of the vehicle wheel being gauged, a trailing wheel having its axis substantially in vertical alignment with the spindle, a substantially vertical swivel pin, an arm mounted on the swivel pin on a substantially horizontal axis, said arm being connected to the trailing wheel and the swivel pin being located in a position which is laterally removed from and forwardly of the trailing wheel in the direction of movement of the vehicle during the gauging operation, a dial, a pivotally mounted pointer for operation over the dial, said pointer being mounted on the side of the axis of the trailing wheel opposite the swivel pin, a second arm carried by the swivel pin, and an articulated connection between the second arm and pointer for actuation of the pointer upon oscillation of the swivel pin.

ROBERT M. GREENLEAF.

REFERENCES CITED

The following references are of record in the file of this patent:

UNITED STATES PATENTS

| Number | Name | Date |
| --- | --- | --- |
| 713,784 | Mellor | Nov. 18, 1902 |
| 1,163,594 | Fry | Dec. 7, 1915 |
| 2,137,485 | Greenleaf et al. | Nov. 22, 1938 |
| 2,170,824 | Lichtenwalner | Aug. 29, 1939 |
| 2,295,184 | Sandbo | Sept. 8, 1942 |
| 2,357,463 | Fields | Sept. 5, 1944 |
| 2,402,041 | Greenleaf et al. | June 11, 1946 |